United States Patent
Gupta et al.

(10) Patent No.: US 9,128,844 B2
(45) Date of Patent: Sep. 8, 2015

(54) ENHANCING ANALYTICS PERFORMANCE USING DISTRIBUTED MULTI-TIERING

(71) Applicant: International Business Machines Corporation, Armonk, NY (US)

(72) Inventors: Karan Gupta, San Jose, CA (US); Himabindu Pucha, San Jose, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/630,203

(22) Filed: Feb. 24, 2015

(65) Prior Publication Data

US 2015/0169448 A1 Jun. 18, 2015

Related U.S. Application Data

(63) Continuation of application No. 13/715,583, filed on Dec. 14, 2012, now Pat. No. 9,021,219.

(51) Int. Cl.
  *G06F 12/00* (2006.01)
  *G06F 12/08* (2006.01)
  *G06F 17/30* (2006.01)

(52) U.S. Cl.
  CPC .......... *G06F 12/08* (2013.01); *G06F 17/30221* (2013.01); *G06F 2212/254* (2013.01)

(58) Field of Classification Search
  CPC .............................................. G06F 17/30221
  See application file for complete search history.

(56) References Cited

U.S. PATENT DOCUMENTS

| | | | |
|---|---|---|---|
| 7,546,486 B2 | 6/2009 | Slik et al. | |
| 7,631,214 B2 | 12/2009 | Bockhold et al. | |
| 8,028,146 B2 * | 9/2011 | Yamamoto | 711/173 |
| 8,285,948 B2 | 10/2012 | Elliott et al. | |
| 8,601,181 B2 | 12/2013 | Miura et al. | |
| 8,788,786 B2 * | 7/2014 | Yamamoto | 711/173 |
| 2001/0052106 A1 * | 12/2001 | Wuytack et al. | 716/2 |
| 2008/0155310 A1 | 6/2008 | Langen et al. | |

OTHER PUBLICATIONS

IBM, Method and System for Multi-Tiered Abstract XML Content Services, Aug. 27, 2009.
Liao et al., A Resynchronization Method Based on Request Logs for Data Replication in a Multi-Tier Network Database Environment, Nokia Siemens Networks 2007.

* cited by examiner

*Primary Examiner* — Brian Peugh
(74) *Attorney, Agent, or Firm* — Lieberman & Brandsdorfer, LLC

(57) ABSTRACT

Embodiments relate to cluster-centric tiered storage with a flexible tier definition to support performance of transactions. Object data is distributed in a multi-tiered shared-nothing cluster. Hierarchical tiers of data storage are assigned different roles within the hierarchy. The tiers are arranged according to a number of cycles required to access a tier. The tiers are managed globally across the cluster and objects are placed in tiers according to a flexible tier definition and the tier arrangement. The probability of object access is computed for objects, and objects are placed on different tiers responsive to the computation and the number of cycles required to access the tier. Objects are moved between tiers responsive to a probability frequency of object access.

20 Claims, 9 Drawing Sheets

ENHANCING ANALYTICS PERFORMANCE USING DISTRIBUTED MULTI-TIERING

CROSS REFERENCE TO RELATED APPLICATION(S)

This application is a continuation patent application claiming the benefit of the filing date of U.S. patent application Ser. No. 13/715,583 filed on Dec. 14, 2012 and titled "Enhancing Analytics Performance Using Distributed Multi-Tiering" now U.S. Pat. No. 9,021,219, which is hereby incorporated by reference.

BACKGROUND

Embodiments relate to an architecture addressing limitations in shared nothing clusters. More specifically, embodiments implement cluster-centric tiered storage with a flexible tier definition to support performance of transactions.

A shared nothing computer cluster is a distributed computing architecture where each computer node is independent and tasks are divided between computers. No one computer node in the cluster has to wait for another computer node in the cluster to perform a task. In other words, there is no single point of failure, as known in a storage area network.

Each node in the shared nothing cluster has some form of data storage, including volatile and persistent. As data is created, it is stored in at least one data storage location, including volatile and/or persistent. The goal in storing data is to decrease the response time to read that data in support of a read transaction. Different formations of the data storage have different levels of performance, and are generally arranged in some form of a hierarchy so that frequently accessed data may be present on a faster form of memory than infrequently accessed data.

BRIEF SUMMARY

A method, computer program product, and system are provided for optimizing placement of data in a multi-tier storage system in a shared-nothing computer cluster.

In one aspect, a method is provided for placing an object in a storage tier within the multi-tier system. A computer cluster is provided in communication with a storage system organized in a hierarchy, with different roles assigned to each storage tier within the hierarchy while supporting global management of the storage tiers across the computer cluster. The storage tiers are arranged according to a number of cycles required to access a tier. Management of the tiers takes place responsive to a flexible tier definition within the hierarchy and the tier arrangement. As an object is designated for placement in data storage, a tier within the hierarchy is selected responsive to a probability of access of the object and the number of cycles required to access the tier. Accordingly, one or more objects are intelligently placed within the hierarchy to optimize the efficiency of the storage system.

In another aspect, a computer program product is provided to optimize placement of an object in a shared-nothing computer cluster having multi-tiered storage. A computer-readable medium is provided with program code executable by a processor. When executed, the program code organizes a storage system within the cluster in a hierarchy. The organization includes assigning different roles to storage tiers within the hierarchy. Program code is provided to arrange the tiers according to a number of cycles required to access a tier. Program code is further provided to address a flexible tier definition provided within the hierarchy, and to place one or more objects in a select storage tier within the hierarchy responsive to the flexible tier definition and the tier arrangement. The location of object placement in the hierarchy is optimized in response to a probability of access of the object and the number of cycles required to access the tier. Accordingly, the computer program product recognizes the hierarchy of the storage system, and utilizes the different roles of the tiers within the hierarchy for placement of data In yet another aspect, a system is provided with a shared-nothing computer cluster having a storage system organized into a hierarchical structure. At least two computer nodes are provided in the computer cluster and in communication with the storage system. Each tier in the storage system hierarchy is assigned a different role. A filesystem is provided in communication with the storage system to manage an object within the hierarchy. The filesystem arranges the tiers according to a number of cycles required to access a tier. The tiers in the hierarchy are managed responsive to the flexible tier definition and the tier arrangement. One or more objects are placed in a select storage tier responsive to a probability of access of the object and the number of cycles required to access the tier. Accordingly, one or more objects are intelligently managed within the hierarchy to optimize the efficiency of the storage system.

Other features and advantages will become apparent from the following detailed description of the presently preferred and/or alternative embodiments, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated. Implications to the contrary are otherwise not to be made.

DETAILED DESCRIPTION

It will be readily understood that components of the present embodiment(s), as generally described and illustrated in the Figures herein, may be arranged and designed in a wide variety of different configurations. Thus, the following detailed description of the embodiments of the apparatus, system, and method, as presented in the Figures, is not intended to limit the scope as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a placement manager, computation manager, etc., to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

In the following description of the embodiments, reference is made to the accompanying drawings that form a part hereof, and which shows by way of illustration the specific embodiment which may be practiced. It is to be understood that other embodiments may be utilized because structural changes may be made without departing from the scope.

Figure 1:
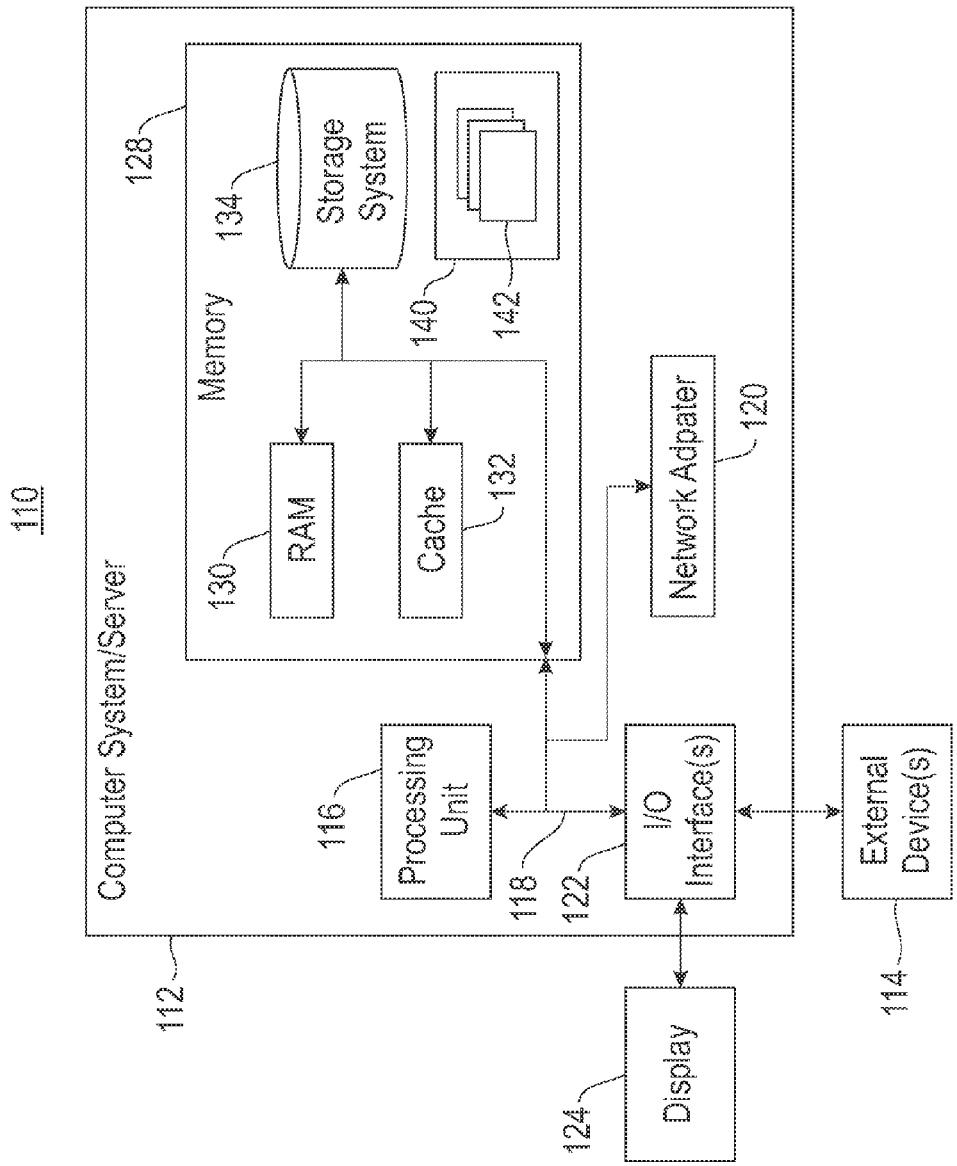
FIG. 1 depicts a cloud computing node according to an embodiment.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (110) is only one example of a suitable cloud computing node and is not intended to suggest any limitation as to the scope of use or functionality of embodiments described herein. Regardless, cloud computing node (110) is capable of being implemented and/or performing any of the functionality set forth hereinabove. In cloud computing node (110) there is a computer system/server (112), which is operational with numerous other general purpose or special purpose computing system environments or configurations. Examples of well-known computing systems, environments, and/or configurations that may be suitable for use with computer system/server (112) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (112) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (112) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (112) in cloud computing node (110) is shown in the form of a general-purpose computing device. The components of computer system/server (112) may include, but are not limited to, one or more processors or processing units (116), a system memory (128), and a bus (118) that couples various system components including system memory (128) to processor (116). Bus (118) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (112) typically includes a variety of computer system readable media. Such media may be any available media that is accessible by a computer system/server (112), and it includes both volatile and non-volatile media, and removable and non-removable media.

System memory (128) can include computer system readable media in the form of volatile memory, such as random access memory (RAM) (130) and/or cache memory (132). Computer system/server (112) may further include other removable/non-removable, volatile/non-volatile computer system storage media. By way of example only, storage system (134) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of the embodiment(s).

Program/utility (140), having a set (at least one) of program modules (142), may be stored in memory (128) by way of example, and not limitation, as well as an operating system, one or more application programs, other program modules, and program data. Each of the operating systems, one or more application programs, other program modules, and program data or some combination thereof, may include an implementation of a networking environment. Program modules (142) generally carry out the functions and/or methodologies of the embodiment(s) as described herein.

Computer system/server (112) may also communicate with one or more external devices (114), such as a keyboard, a pointing device, a display (124), etc.; one or more devices that enable a user to interact with computer system/server (112); and/or any devices (e.g., network card, modem, etc.) that enable computer system/server (112) to communicate with one or more other computing devices. Such communication can occur via Input/Output (I/O) interfaces (122). Still yet, computer system/server (112) can communicate with one or more networks such as a local area network (LAN), a general wide area network (WAN), and/or a public network (e.g., the Internet) via network adapter (120). As depicted, network adapter (120) communicates with the other components of computer system/server (112) via bus (118). It should be understood that although not shown, other hardware and/or software components could be used in conjunction with computer system/server (112). Examples, include, but are not limited to: microcode, device drivers, redundant processing units, external disk drive arrays, RAID systems, tape drives, and data archival storage systems, etc.

Figure 2:
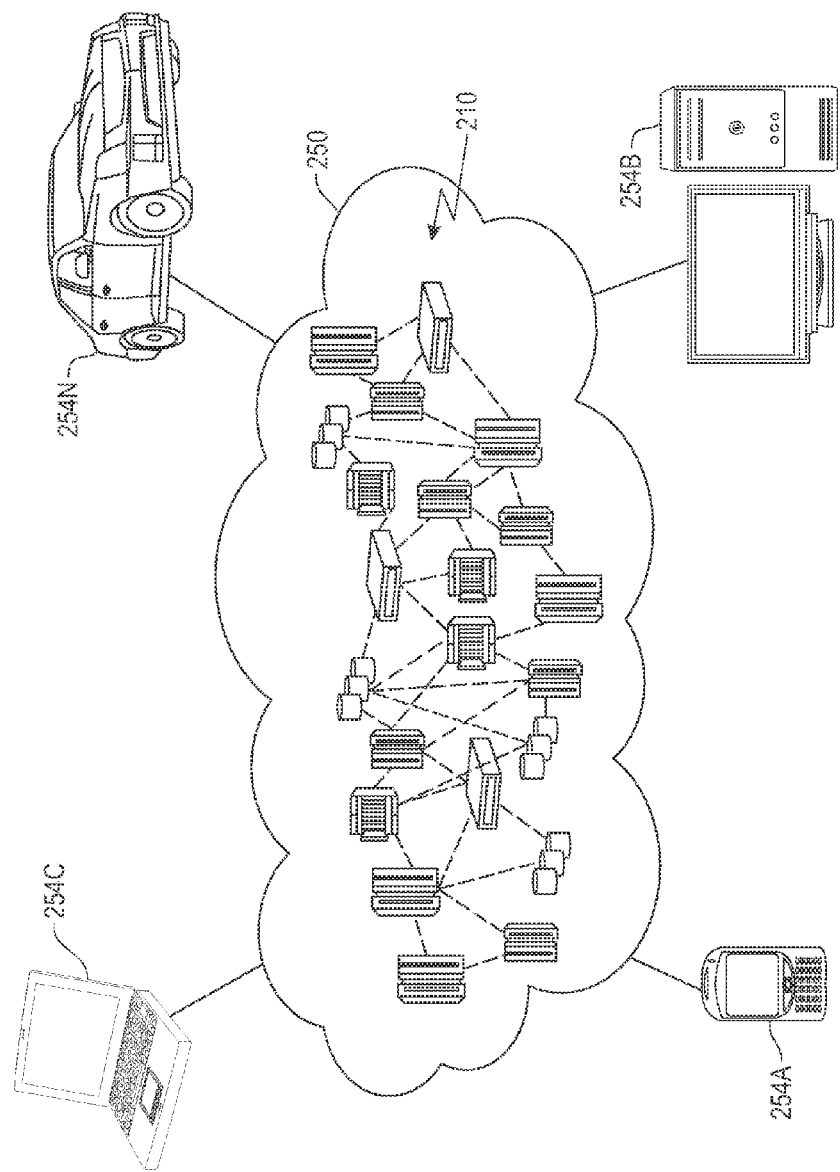
FIG. 2 depicts a cloud computing environment according to an embodiment.

Referring now to FIG. 2, illustrative cloud computing environment (250) is depicted. As shown, cloud computing environment (250) comprises one or more cloud computing nodes (210) with which local computing devices used by cloud consumers, such as, for example, personal digital assistant (PDA) or cellular telephone (254A), desktop computer (254B), laptop computer (254C), and/or automobile computer system (254N) may communicate. Nodes (210) may communicate with one another. They may be grouped (not shown) physically or virtually, in one or more networks, such as Private, Community, Public, or Hybrid clouds as described hereinabove, or a combination thereof. This allows cloud computing environment (250) to offer infrastructure, platforms and/or software as services for which a cloud consumer does not need to maintain resources on a local computing device. It is understood that the types of computing devices (254A)-(254N) shown in FIG. 2 are intended to be illustrative only and that computing nodes (210) and cloud computing environment (250) can communicate with any type of computerized device over any type of network and/or network addressable connection (e.g., using a web browser).

Figure 3:
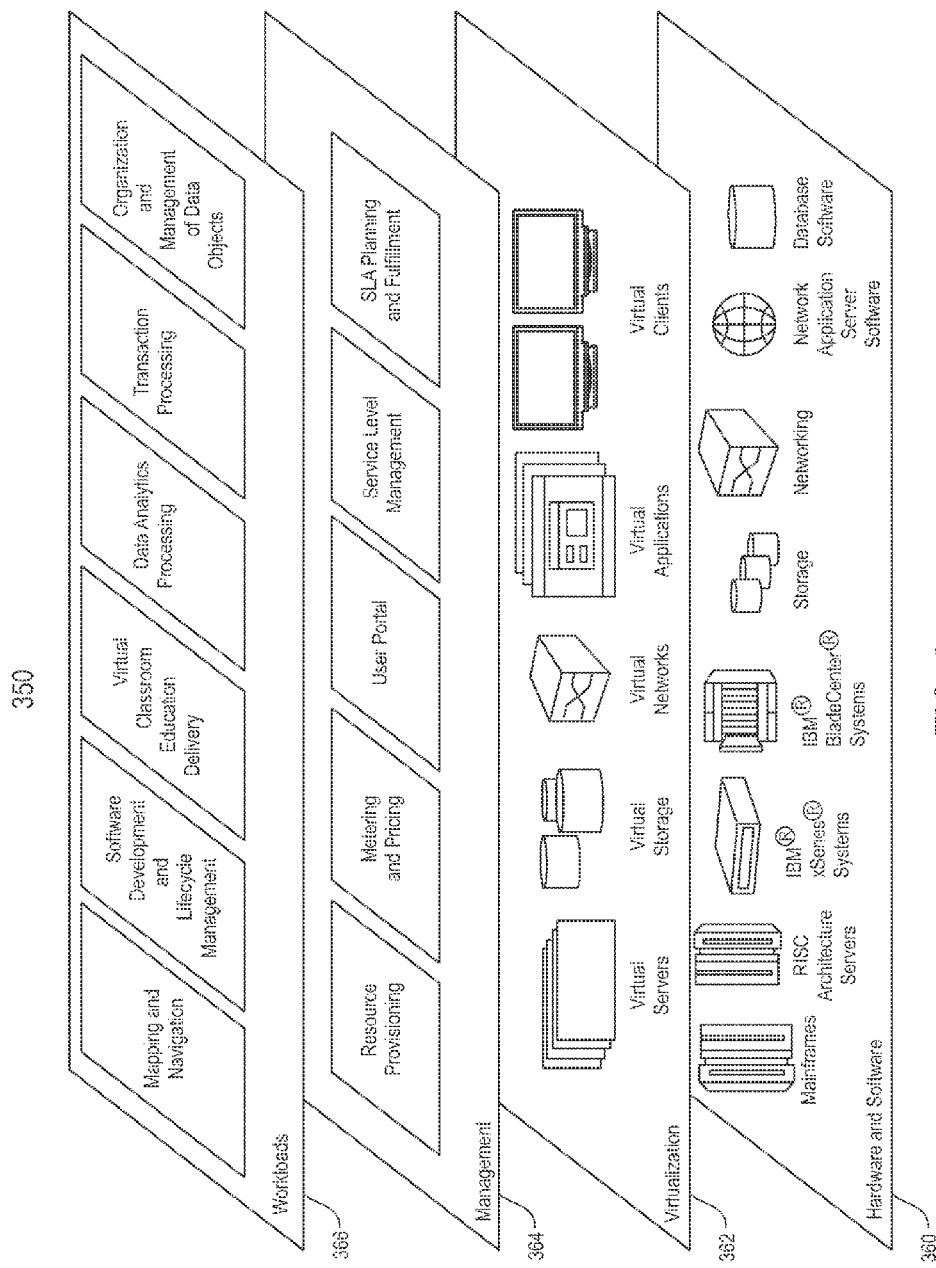
FIG. 3 depicts abstraction model layers according to an embodiment.

Referring now to FIG. 3, a set of functional abstraction layers provided by cloud computing environment (250) is shown. It should be understood in advance that the components, layers, and functions shown in FIG. 3 are intended to be illustrative only and embodiments are not limited thereto. As depicted, the following layers and corresponding functions are provided: hardware and software layer (360), virtualization layer (362), management layer (364), and workload layer (366). The hardware and software layer (360) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (362) provides an abstraction layer from which the following examples of virtual entities may be provided: virtual servers; virtual storage; virtual networks, including virtual private networks; virtual applications and operating systems; and virtual clients.

In one example, management layer (364) may provide the following functions: resource provisioning, metering and pricing, user portal, service level management, and SLA planning and fulfillment. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (366) provides examples of functionality for which the cloud computing environment may be utilized. An example of workloads and functions which may be provided from this layer includes, but is not limited to, organization and management of data objects within the cloud computing environment. In the shared pool of configurable computer resources described herein, hereinafter referred to as a cloud computing environment, files may be shared among users within multiple data centers, also referred to herein as data sites. A series of mechanisms are provided within the shared pool to provide organization and management of data storage. A computer storage system provided within shared pool of resources contains multiple levels known as storage tiers. Each storage tier is arranged within a hierarchy and is assigned a different role within the hierarchy. It should be understood that this hierarchically organized storage system maintains a flexible tier definition, such that tiers can be managed as a singleton on every node or tiers can be managed globally across all or a subset of the nodes in the system.

Figure 4:
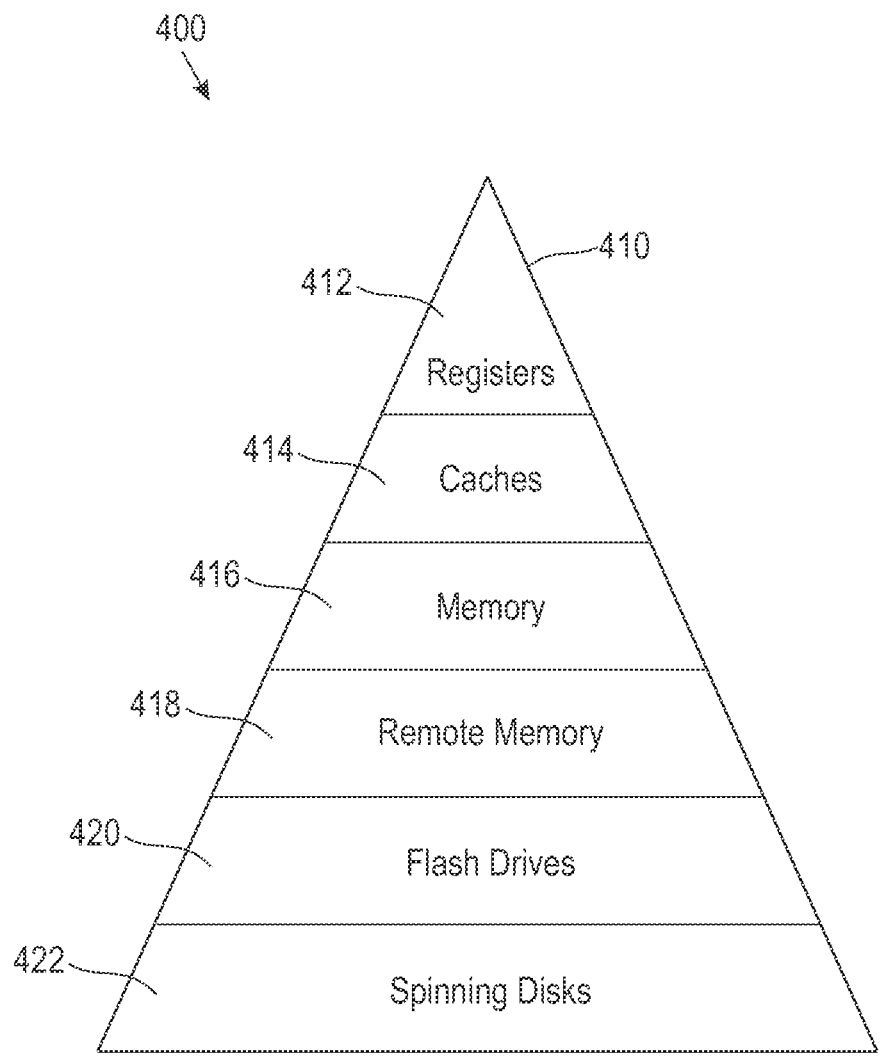
FIG. 4 is a block diagram illustrating a storage system hierarchy for a cluster.

FIG. 4 is a block diagram (400) of one embodiment for the hierarchy (410) of the storage system. Tiers are arranged according to the number of cycles required to access the tier. A multitude of tier levels are provided however any number of tiers may be implemented. Some examples of tier storage levels arranged according to average number of cycles include: registers (412), caches (414), memory (416), remote memory (418), flash drives (420), and spinning disks (422). Tiers requiring fewer cycles for access can be accessed more efficiently and tend to have less storage space. Data objects, hereinafter referred to as objects, are placed and moved within tiers responsive to the calculated probability of access to the object. Accordingly, a hierarchical storage system with multi-functioning tiers is provided for increased efficiency of data storage.

Figure 5:
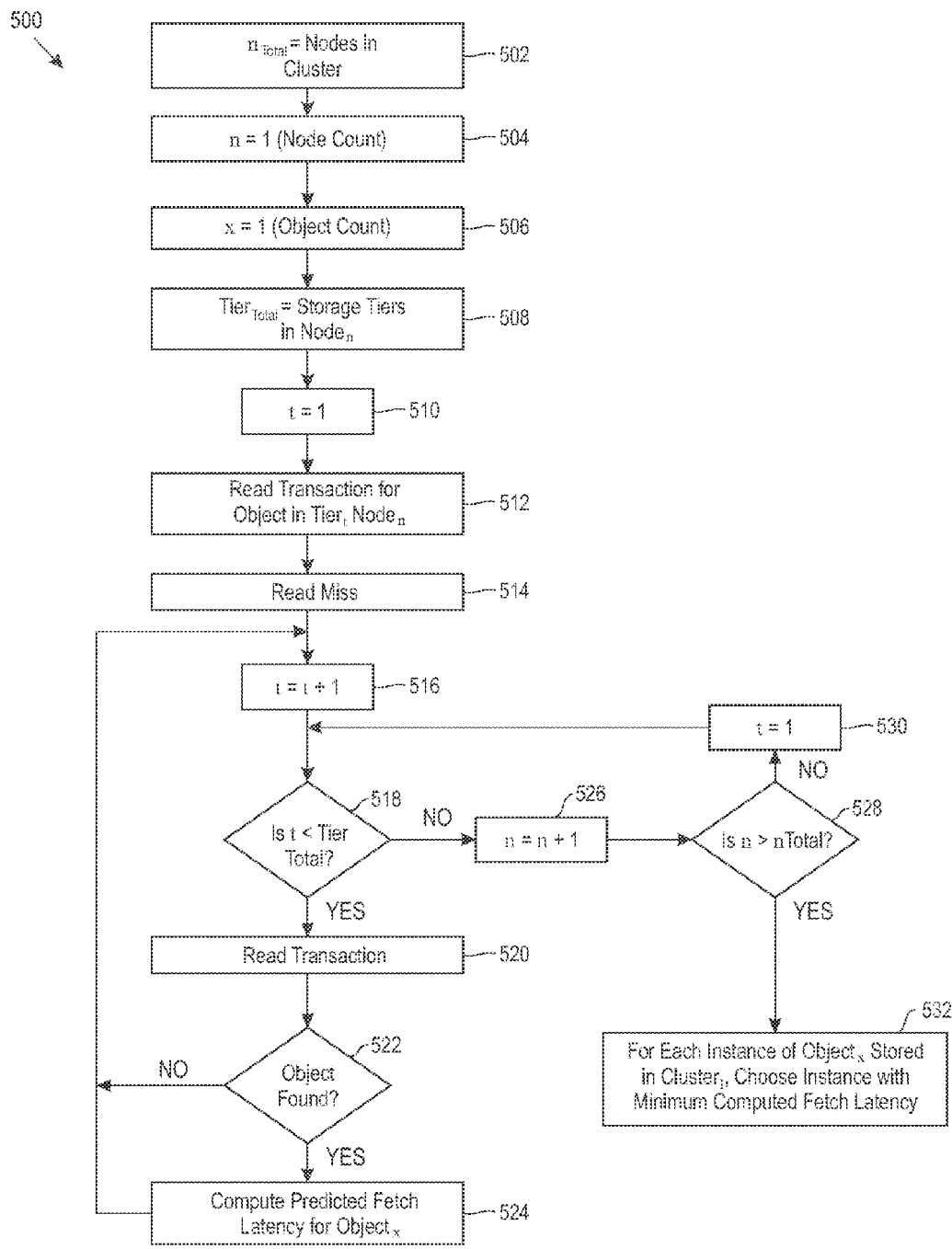
FIG. 5 depicts a flow chart illustrating a method for choosing an instance of an object with minimum predicted fetch latency.

In a hierarchical storage system within a node cluster, copies of objects may be stored and/or accessed in more than one tier as well as in more than one node. The time required to locate data in a storage location is referred to as latency. FIG. 5 is a flow chart (500) illustrating a method for selecting an instance of an object having the lowest predicted latency in response to a read transaction miss. The value $n_{total}$ is equal to the number of nodes in the cluster (502). A counting variable n is set to the integer value 1 (504), where n represents a specific node in a cluster. Similarly, an object counting variable x is set to the integer value 1 (506), where x represents a specific object. The value $t_{total}$ represents the quantity of storage tiers in a specific cluster node, $node_n$ (508), and a tier counting variable t is set to the integer value 1 (510). Accordingly, all variables representing the nodes in the cluster, specific objects, and storage tiers in the storage hierarchy are initialized.

Following the initialization process, $object_x$ is searched for in $tier_t$ of $node_n$ in response to a read transaction (512). In this example, the object is not found in $tier_t$ (514), resulting in a read miss. In response to the miss (514), the object is searched for in a different tier. The variable t is incremented (516) and it is determined if there are any remaining levels in the hierarchy to search in response to the read transaction (518). If at step (518) it is determined that there are additional levels in the hierarchy, then the read transaction is processed for object, in $tier_t$ (520). Following the read transaction at step (520) it is determined if the object to support the read transaction was found (522). A negative response is followed by a return to step (516), and a positive response is followed by computing predicted fetch latency for the found $object_x$ (524). The computation of the fetch latency of object, is followed by a return to step (516) to see if there are any other instances of object, in the storage hierarchy.

As shown in steps (516)-(524), the tiers of the storage hierarchy for a single node in the cluster are searched for instances of a select object to support a read transaction. If at step (518) the response to the determination is negative, this is an indication that all the tiers in $node_n$ have been searched. The node counting variable, n, is incremented to continue the object search on a different node in the cluster. As shown, the variable n is incremented (526) and it is determined if all of the nodes in the cluster have been evaluated for presence of the object (528). A negative response is followed by an initialization of the variable t (530) followed by a return to step (518). However, a positive response to the determination at step (528) indicates that all tiers in all nodes in the cluster have been searched for the subject object, $object_x$. Once all of the tiers in each of the nodes in the cluster have been searched, the fetch latency for each instance of object, is known. The instance of the object found in the tier that is predicted to have the minimum fetch latency is selected (532). In one embodiment, the selected object instance is flagged, or otherwise identified, as a target for any read transactions from a node in the cluster. Accordingly, following a read transaction miss, the predicted fetch latency for each instance of an object is computed and the object is accessed from the object instance having the minimum fetch latency in the system.

Figure 6:
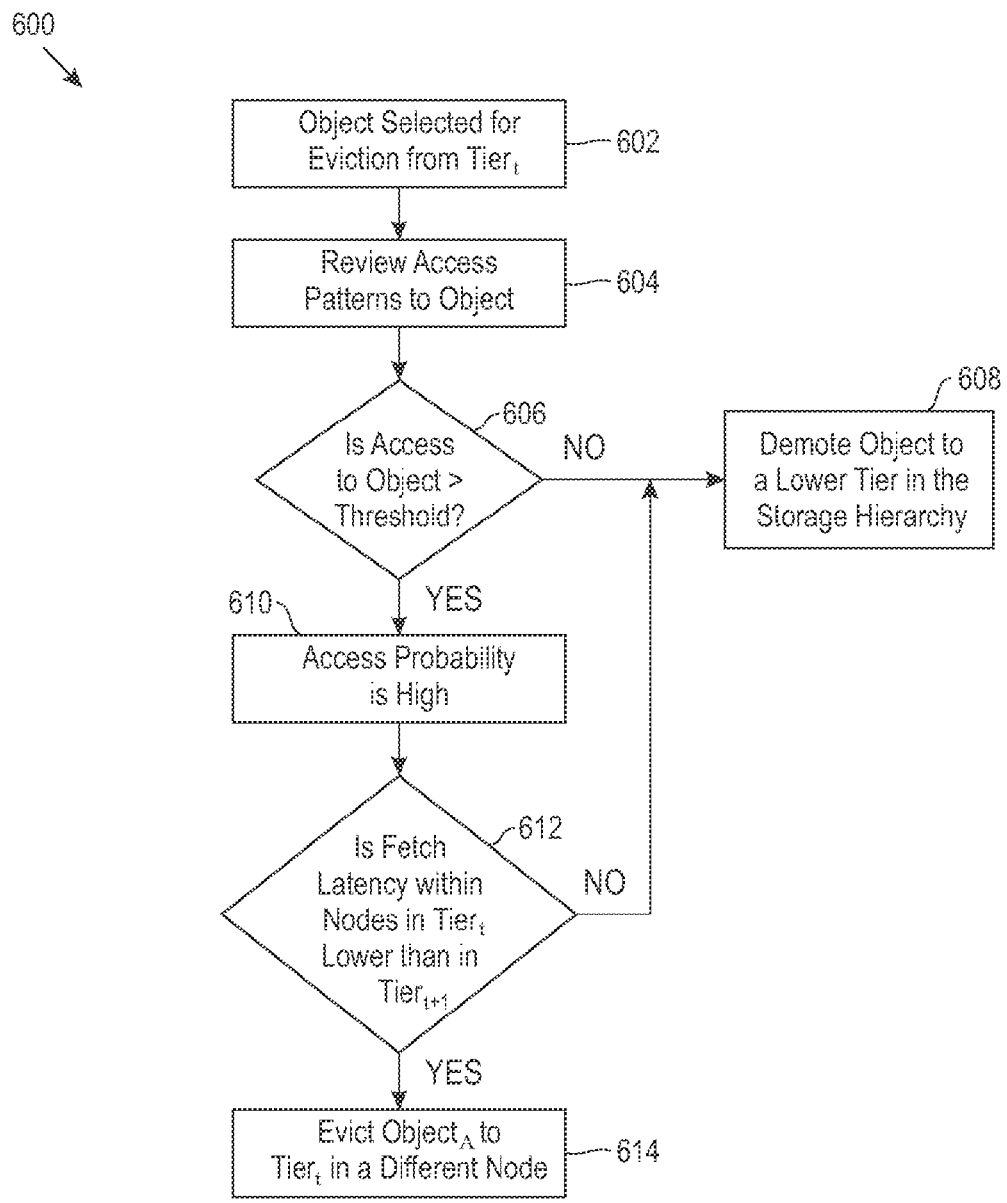
FIG. 6 depicts a flow chart illustrating a method for evicting an object from a tier.

It is known that higher tiers in a storage cluster, while less expensive to access, tend to have less storage space than lower tiers. To accommodate limited space in the storage hierarchy, objects are periodically evicted from higher tiers to make space for other objects, such as a new object to be added to one of the higher tiers. FIG. 6 is a flow chart (600) depicting a method for evicting an object from a tier and moving the object within the hierarchy. An object is selected for eviction from a tier t (602). The access patterns of the selected object are reviewed (604). In one embodiment, these access patterns include the frequency at which the object has been accessed historically. It is determined if the frequency rate at which the object is accessed is greater than a particular threshold (606). A negative response is followed by a demotion of the object to a tier lower in the hierarchy (608). In one embodiment, the object is demoted from the current tier to the next lower tier in the hierarchy. Accordingly, objects that are not accessed at a set frequency are moved to a tier that is more expensive to access but includes more storage space.

If at step (606) it is determined that the object is accessed at a frequency greater than the threshold, then the predicted probability of access to the object is considered high (610). This prediction is followed by determining if within the nodes, the fetch latency in the current tier, tier is lower than the fetch latency in the next $tier_{t+1}$ (612). A negative response is followed by a return to step (608), demonstrating that frequently the fetch latency of the object is accounted for with respect to object placement. A positive response to step (612) is an indication that the object should remain in this tier in the hierarchy, and is followed by an eviction of the object from tier of a first node in the cluster to a tier of a second node in the cluster (614). A frequently accessed object is therefore cleared for space while still maintaining efficient access from a different node in the cluster. Accordingly, an object considered to have a high access probability is moved to a storage tier of efficient access at the same level in the hierarchy.

Figure 7:
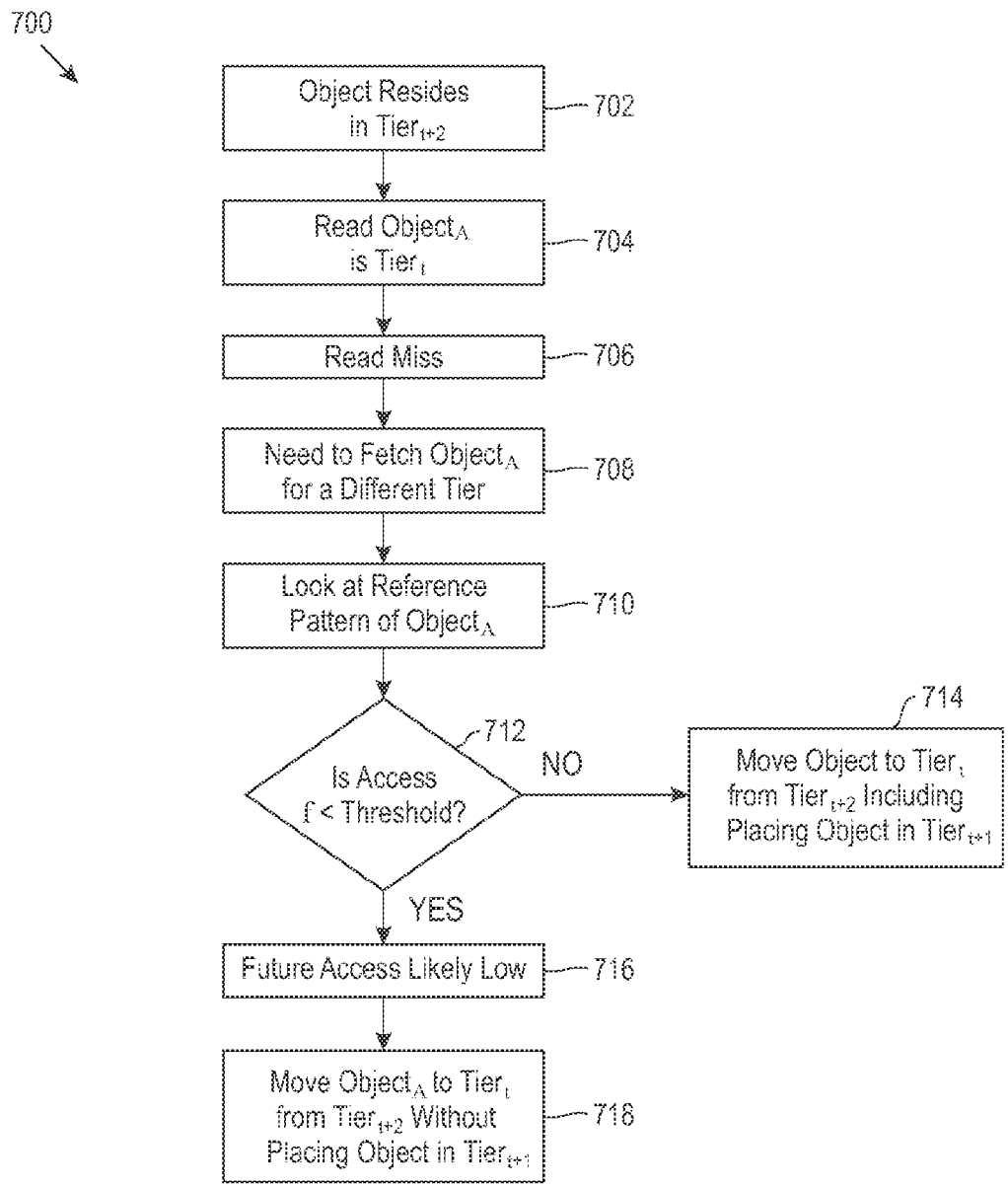
FIG. 7 depicts a flow chart illustrating a method for skipping a tier upon eviction and placement of an object in a different tier.

As shown in FIG. 6, an object may be evicted to an adjacent tier, (also referred to as a consecutive tier) or a same level tier in a different node. FIG. 7 is a flow chart (700) depicting an example for moving an object within non-adjacent tiers. An object residing in a lower tier $tier_{t+2}$ is read from tier (704). In this example, the object that is read from tier does not reside in tier and the read transaction accordingly results in a read miss (706). To be read from $tier_t$, the object must be fetched from a different tier (708). The reference patterns of the object are reviewed (710), and it is determined if the probability frequency at which the object is accessed, is less than a particular threshold (712). The probability assessment is based on the object reference pattern. If the access frequency is greater than the particular threshold, the access frequency of the object is considered high. The object is moved from the tier lower than tier to tier and is additionally placed in a tier higher than the tier from which it was moved yet lower than $tier_t$. As shown, the object is moved from $tier_{t+2}$ to $tier_t$, and is additionally placed in $tier_{t+1}$ (714). Accordingly, an object considered to have high frequency access is placed in a non-consecutive storage tier to accommodate a read transaction.

If at step (712) the access frequency is less than the particular threshold then future access frequency is estimated to be low (716). The object is moved from the tier lower than tier to tier but is not placed in a tier between that of tier and the tier from which it was moved (718). For example, if the tiered storage is a cache layer ($tier_t$), random access memory ($tier_{t+1}$), and disk storage ($tier_{t+2}$), and the object is read and missed from the cache layer, the object is moved from the disk storage to the cache layer and is not additionally placed in random access memory provided that the object is considered to have low frequency access. Accordingly, space is not taken up in additional tiers for objects having a low probability access frequency.

Figure 8:
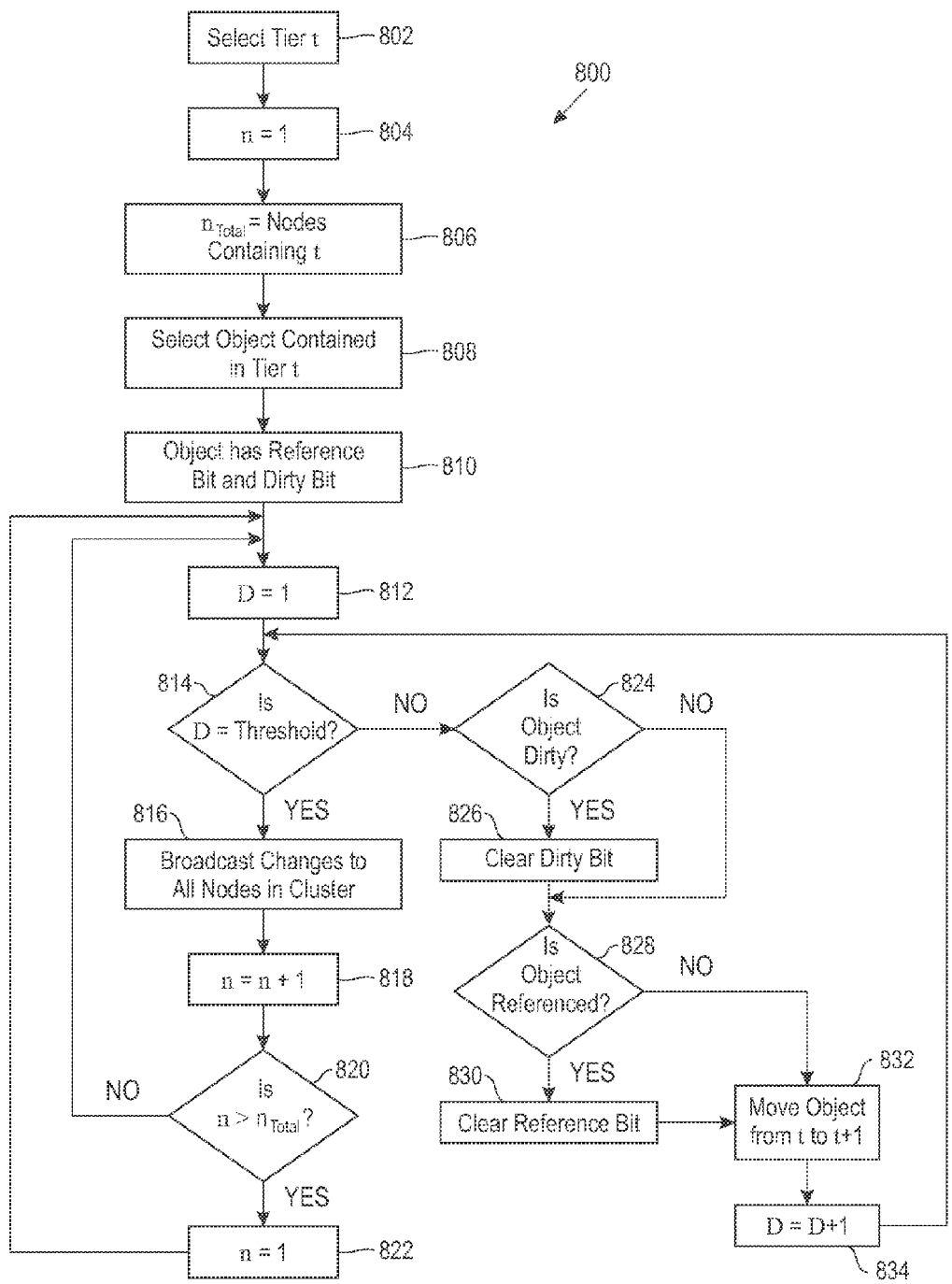
FIG. 8 depicts a flow chart illustrating a method for demoting an object to a different tier.

As demonstrated in FIG. 7, objects may be promoted in the hierarchy. FIG. 8 is a flow chart (800) illustrating a method for demoting objects within the hierarchy of the storage system. A tier is selected (802). A counting variable n, representing a select node, is initialized (804). The variable $n_{total}$ is representative of a value representing the total number of nodes in the cluster containing $tier_t$ (806). An object contained in tier is selected (808). The object contains both a reference bit and a dirty bit (810). A counting variable D is initialized (812). The variable D is set to maintain equilibrium among all nodes in the cluster for the management of object data. It is determined if D is equal to a predetermined threshold (814). A negative response leads to the determination of whether the object is dirty (824). In one embodiment, an object in volatile memory that has been modified, but not yet written back to persistent storage, is referred to as a dirty object. A positive response to the determination at step (824) is followed by a clearing of the dirty bit (816) further followed by a determination if the object is referenced (828). A negative response to step (824) is followed by a jump to step (828). A positive response to step (828) is followed by a clearing of the reference bit (832), which is further followed by a moving of the object from tier to a tier greater than $tier_t$. In one embodiment, the object is moved from tier to $tier_{t+1}$ (832). A negative response to step (830) is followed by a jump to step (832). Following step (832), the counting variable D is incremented (834) followed by a return to step (814). Accordingly, the reference bit and the dirty bit of an object are removed from an object prior to moving the object to a different tier in the hierarchy.

If it is determined in step (814) that the counting variable D is equal to the threshold, then any changes regarding the movement of objects to different tiers are broadcast to all nodes in the cluster (816). The value of the counting variable n is incremented (818), and it is determined if n is greater than the nodes in the cluster containing tier$_t$, i.e. n$_{total}$. A positive response is followed by initializing n (822) followed by a return to step (812) and a negative response is followed by a return to step (812). In one embodiment, the value of n is not incremented as in step (822). Rather, a new integer value of n is randomly selected between the values of 1 and n$_{total}$ followed by an immediate return to step (812). Accordingly, objects are periodically moved between tiers across all nodes in the cluster in an effort to maintain a balance among the tiers in the storage hierarchy and among the nodes in the cluster.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
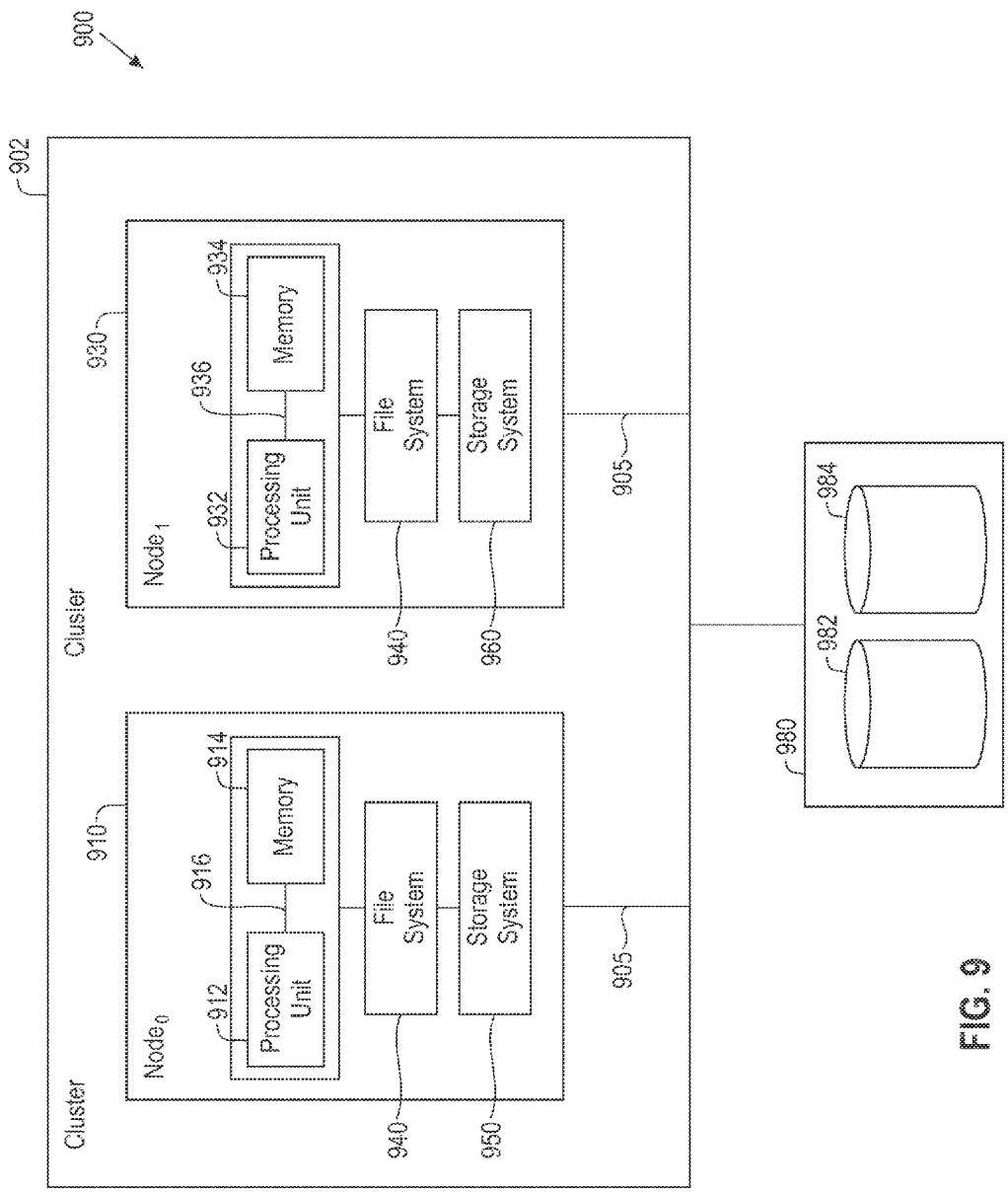
FIG. 9 is a block diagram illustrating a system for a multi-tiered cluster having optimized data storage placement.

FIG. 9 is a block diagram (900) illustrating tools embedded in a computer cluster to efficiently distribute objects in a hierarchical storage system. A plurality of nodes is provided in a computer cluster (902) in communication with remote data storage (980). While two data storage units, (982) and (984) respectively, are shown, the remote storage (980) may include any number of data storage units. In the example shown herein, there are two nodes (910) and (930). However, the nodes should not be limited to the quantity illustrated. In the illustration shown herein, node$_0$ (910) is shown having a processing unit (912) in communication with memory (914) across a bus (916). Node$_0$ (910) is in communication with local persistent storage (950), which is one level of the hierarchy described in FIG. 8. The volatile layers of the hierarchy, such as layers (412)-(416) are represented in memory (914). Node$_1$ (930) is in communication with node$_0$ (910) across a network (905). As shown, node$_1$ (930) is provided with a processing unit (932) in communication with memory (934) across a bus (936), and in communication with local persistent storage system (960), which is one level of the hierarchy described in FIG. 8. Volatile layers of the hierarchy, such as layers (412)-(416) are represented in memory (934). Accordingly, at least two nodes are provided in a system having tiered storage.

A filesystem (940) is provided in the cluster (902) to manage object data in the tiered storage. Node$_1$ (910) is shown with the filesystem (940) in communication with memory (934). The functionality supported by the filesystem includes searching for an instance of the object within the hierarchy in response to a read transaction for the object. The filesystem (940) moves an object within a tier to a different tier through the process of promotion or demotion. In one embodiment, this movement is reflective of a predicted fetch latency of an object as calculated by the filesystem (940). More specifically, the filesystem (940) reviews an access pattern of a selected object and moves the selected object within the cluster hierarchy based upon the access pattern. In one embodiment, the filesystem (940) evicts a selected object from a storage tier of a select node and moves the selected object to the same storage tier within a different node in the cluster. Accordingly, the filesystem moves a selected object between tiers and between nodes in the cluster.

The filesystem (940) also computes a predicted fetch latency for an instance of an object within a particular location, and compares predicted fetch latencies for all instances of the object found in various locations of storage within the cluster and selects the instance of the object having the minimum computed fetch latency. In one embodiment, the filesystem (940) determines movement of a replica of the data object between tiers of the hierarchy within a distributed global clock algorithm. Accordingly, the filesystem (940) provides a mathematic analysis upon which to base any movement of the object within the hierarchy or across the cluster.

The flowcharts and block diagrams in the Figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited in the form disclosed. Many modifications and variations will be apparent to those of ordinary skill in the art without departing from the scope and spirit. The embodiment was chosen and described in order to best explain the principles and the practical application, and to enable others of ordinary skill in the art to understand for the various embodiments with various modifications as are suited to the particular use contemplated. Accordingly, the enhanced cloud computing model supports flexibility with respect to transaction processing, including, but not limited to, optimizing the storage system and processing transactions responsive to the optimized storage system.

ALTERNATIVE EMBODIMENT(S)

It will be appreciated that, although specific embodiments have been described herein for purposes of illustration, various modifications may be made without departing from the spirit and scope. Accordingly, the scope of protection is limited only by the following claims and their equivalents.

What is claimed is:

1. A method comprising:
in a computer cluster in communication with a storage system, the storage system organized in a hierarchy, assigning a different role to each storage tier within the hierarchy, each role related to a workload characteristic;
arranging the tiers according to a number of cycles required to access a tier;
managing the tiers across the cluster, the management responsive to a flexible tier definition within the hierarchy and the tier arrangement; and
selecting a first storage tier for placement of a data object, and placing the data object in the first tier, the selection responsive to a calculated probability of access of the object and the number of cycles required to access the tier.

2. The method of claim 1, further comprising moving the object within the hierarchy, the moving comprising:
comparing a frequency of access to the data object to a threshold; and
placing the object in a second tier based on the comparison.

3. The method of claim 2, wherein the comparison is based on a reference pattern for the object.

4. The method of claim 2, further comprising moving the object between non-adjacent tiers of the hierarchy.

5. The method of claim 4, further comprising evaluating a probability frequency of object access in response to a read miss of the object.

6. The method of claim 5, further comprising placing the object in a non-adjacent tier to accommodate a read action for a high probability frequency of object access.

7. The method of claim 5, further comprising moving the object to an adjacent tier to accommodate a read action for a low probability frequency of object access.

8. A computer program product for use with objects in a computer cluster, the computer program product comprising a computer-readable storage medium having program code embodied therewith, the program code being executable by a processor to:
organize a storage system in communication with the cluster into a hierarchy, including assigning a different role to each tier within the hierarchy, each role related to a workload characteristic;

arrange the tiers according to a number of cycles required to access a tier;

manage the tiers across the cluster responsive to a flexible tier definition within the hierarchy and the tier arrangement; and select a first storage tier for a data object and place the data object in the first tier, the selection responsive to a calculated probability of access of the object and the number of cycles required to access the first tier.

9. The computer program product of claim 8, further comprising program code to move the object within the hierarchy, the moving comprising program code to:

compare a frequency of access to the data object to a threshold; and place the object in a second tier based on the comparison.

10. The computer program product of claim 9, wherein the comparison is based on a reference pattern for the object.

11. The computer program product of claim 9, further comprising program code to move the object between non-adjacent tiers of the hierarchy.

12. The computer program product of claim 11, further comprising program code to evaluate a probability frequency of object access in response to a read miss of the object.

13. The computer program product of claim 12, further comprising program code to place the object in a non-adjacent tier to accommodate a read action for a high probability frequency of object access.

14. The computer program product of claim 12, further comprising program code to move the object to an adjacent tier to accommodate a read action for a low probability frequency of object access.

15. A system comprising:

two or more nodes in a computer cluster in communication with a storage system, the storage system organized in a hierarchy, each storage tier assigned a different role within the hierarchy; and a filesystem in communication with the storage system, the file system to manage the tiers across the cluster, including:

arrange the tiers according to a number of cycles required to access a tier;

manage the tiers responsive to a flexible tier definition and the tier arrangement; and select a first storage tier for placement of a data object and place the data object in the selected tier, the selection responsive to a calculated probability of access of the object and the number of cycles required to access the tier.

16. The system of claim 15, further comprising movement of the object within the hierarchy, comprising:

comparison of a frequency access to the data object to a threshold; and placement of the object in a second tier based on the comparison.

17. The system of claim 16, wherein the comparison is based on a reference pattern for the object.

18. The system of claim 16, further comprising movement of the object within non-adjacent tiers of the hierarchy.

19. The system of claim 18, further comprising evaluation of a probability frequency of object access to a read miss of the object.

20. The system of claim 19, further comprising placement of the object in a non-adjacent tier to accommodate a read action for a high probability frequency of object access.

* * * * *